(12) United States Patent
Gabriel et al.

(10) Patent No.: US 6,664,751 B1
(45) Date of Patent: Dec. 16, 2003

(54) METHOD AND ARRANGEMENT FOR A CONTROLLING STRATEGY FOR ELECTRONIC COMPONENTS IN A HYBRID ELECTRIC VEHICLE

(75) Inventors: David Crist Gabriel, Royal Oak, MI (US); Renuka Vikram Gokhale, Farmington Hills, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/064,165

(22) Filed: Jun. 17, 2002

(51) Int. Cl.[7] ............................. B60H 1/16; B60K 1/00
(52) U.S. Cl. ................. 318/599; 318/606; 180/65.4; 180/65.2
(58) Field of Search ............... 180/65.4, 65.2, 180/65.1, 65.3, 65.6; 318/599, 606, 607

(56) References Cited

U.S. PATENT DOCUMENTS

| | | | |
|---|---|---|---|
| 4,950,752 A | * | 8/1990 | Whitaker .................... 536/128 |
| 5,001,601 A | | 3/1991 | Fuoco |
| 5,453,911 A | | 9/1995 | Wolgemuth et al. |
| 5,504,378 A | | 4/1996 | Lindberg et al. |
| 5,647,534 A | | 7/1997 | Kelz et al. |
| 5,666,269 A | | 9/1997 | Romero et al. |
| 5,678,760 A | | 10/1997 | Muso et al. |
| 5,685,361 A | | 11/1997 | Demmler et al. |
| 5,740,015 A | | 4/1998 | Donegan et al. |
| 5,841,634 A | | 11/1998 | Visser |
| 5,934,398 A | | 8/1999 | Hotta |
| 5,947,188 A | | 9/1999 | Nestvall |
| 5,979,540 A | | 11/1999 | Allison et al. |
| 6,450,275 B1 | * | 9/2002 | Gabriel et al. .............. 180/65.4 |

* cited by examiner

*Primary Examiner*—Bao Q. Vu

(57) ABSTRACT

A method for controlling a cooling arrangement for electronic components in a hybrid electric vehicle is disclosed. The method includes arranging an electronics cooling loop aboard a hybrid electric vehicle in which a DC to DC converter, DC to AC inverter, and an electronics radiator are placed in fluid communication, one with the others, for cooling the DC to DC converter and the DC to AC inverter; sensing a temperature condition in the electronics cooling loop; and discontinuing operation of the DC to DC converter when a predetermined upper threshold temperature condition is sensed in the electronics cooling loop. A voltage condition of a 12 volt battery may also be sensed, and operation of the DC to DC converter may be resumed when the voltage condition sensed falls below a predetermined lower voltage limit.

24 Claims, 5 Drawing Sheets

METHOD AND ARRANGEMENT FOR A CONTROLLING STRATEGY FOR ELECTRONIC COMPONENTS IN A HYBRID ELECTRIC VEHICLE

BACKGROUND OF INVENTION

1. Industrial Applicability

The present invention finds applicability in the transportation industries, and more specifically private and commercial vehicles. Of particular importance is the invention's incorporation into hybrid electric vehicles.

2. Background Art

Generally, a hybrid electric vehicle combines electric propulsion with traditional internal combustion engine propulsion to achieve enhanced fuel economy and/or lower exhaust emissions. Electric propulsion has typically been generated through the use of batteries and electric motors. Such an electric propulsion system provides the desirable characteristics of high torque at low speeds, high efficiency, and the opportunity to regeneratively capture otherwise lost braking energy. Propulsion from an internal combustion engine provides high energy density, and enjoys an existing infrastructure and lower costs due to economies of scale. By combining the two propulsive systems with a proper control strategy, the result is a reduction in the use of each device in its less efficient range. Furthermore, and as shown in FIG. 1 regarding a parallel hybrid configuration, the combination of a downsized engine with an electric propulsion system into a minimal hybrid electric vehicle results in a better utilization of the engine, which improves fuel consumption. Furthermore, the electric motor and battery can compensate for reduction in the engine size.

In typical configurations, the combination of the two types of propulsion systems (internal combustion and electric) is usually characterized as either series or parallel hybrid systems. In a pure series hybrid propulsion system, only the electric motor(s) are in direct connection with the drive train and the engine is used to generate electricity which is fed to the electric motor(s). The advantage of this type of system is that the engine can be controlled independently of driving conditions and can therefore be consistently run in its optimum efficiency and low emission ranges. A key disadvantage to the series arrangement is the loss in energy experienced because of the inefficiencies associated with full conversion of the engine output to electricity. In a pure parallel hybrid propulsion system, both the engine and the electric motor(s) are directly connected to the drive train and either one may independently drive the vehicle. Because there is a direct mechanical connection between the engine and the drive train in a parallel hybrid propulsion system, less energy is lost through conversion to electricity compared to a series hybrid propulsion system. The operating point for the engine, however, can not always be chosen with full freedom.

The two hybrid propulsion systems can be combined into either a switching hybrid propulsion system or a power-split hybrid propulsion system. A switching hybrid propulsion system typically includes an engine, a generator, a motor and a clutch. The engine is typically connected to the generator. The generator is connected through a clutch to the drive train. The motor is connected to the drive train between the clutch and the drive train. The clutch can be operated to allow series or parallel hybrid propulsion.

A power-split hybrid system, as is exemplarily employed with respect to the present invention, includes an engine, a generator and a motor. The engine output is "split" by a planetary gear set into a series path from the engine to the generator and a parallel path from the engine directly to the power train. In a power-split hybrid system, the engine speed can be controlled by varying the power split to the generator by way of the series path, while maintaining the mechanical connection between the engine and drive train through the parallel path. The motor augments the engine on the parallel path in a similar manner as a traction motor in a pure parallel hybrid propulsion system, and provides an opportunity to use energy directly through the series path, thereby reducing the losses associated with converting the electrical energy into, and out of chemical energy at the battery.

In a typical power-split hybrid system, the generator is usually connected to the sun gear of the planetary gear set. The engine is connected to the planetary carrier and the output gears (usually including an output shaft and gears for interconnection with the motor and the wheel-powering, final drive train) are connected to the ring gear. In such a configuration, the power-split hybrid system can generally be operated in four different modes; one electric mode and three hybrid modes.

In the electric mode, the power-split hybrid system propels the vehicle utilizing only stored electrical energy and the engine is turned off. The tractive torque is supplied from the motor, the generator, or a combination of both. This is the preferred mode when the desired power is low enough that it can be produced more efficiently by the electrical system than by the engine and when the battery is sufficiently charged. This is also a preferred mode for reverse driving because the engine cannot provide reverse torque to the power train in this configuration.

In the parallel hybrid mode, the engine is operating and the generator is locked. By doing this, a fixed relationship between the speed of the engine and the vehicle speed is established. The motor operates as either a motor to provide tractive torque to supplement the engine's power, or can be operated to produce electricity as a generator. This is a preferred mode whenever the required power demand requires engine operation and the required driving power is approximately equal to an optimized operating condition of the engine. This mode is especially suitable for cruising speeds exclusively maintainable by the small internal combustion engine fitted to the hybrid electric vehicle.

In a positive split hybrid mode, the engine is on and its power is split between a direct mechanical path to the drive train and an electrical path through the generator. The engine speed in this mode is typically higher than the engine speed in the parallel mode, thus deriving higher engine power. The electrical energy produced by the generator can flow to the battery for storage or to the motor for immediate utilization. In the positive split mode, the motor can be operated as either a motor to provide tractive torque to supplement the engine's power or to produce electricity supplementally with the generator. This is the preferred mode whenever high engine power is required for tractive powering of the vehicle, such as when high magnitude acceleration is called for, as in passing or uphill ascents. This is also a preferred mode when the battery is charging.

In a negative split hybrid mode, the engine is in operation and the generator is being used as a motor against the engine to reduce its speed. Consequently, engine speed, and therefore engine power, are lower than in parallel mode. If needed, the motor can also be operated to provide tractive torque to the drive train or to generate electricity therefrom. This mode is typically never preferred due to increased losses at the generator and planetary gear system, but will be utilized when engine power is required to be decreased below that which would otherwise be produced in parallel mode. This situation will typically be brought about because the battery is in a well charged condition and/or there is low tractive power demand. In this regard, whether operating as a generator or motor, the torque output of the generator is always of the same sense (+/−); that is, having a torque that is always directionally opposed to that of the engine. The sign of the speed of the generator, however, alternates between negative and positive values depending upon the direction of rotation of its rotary shaft, which corresponds with generator vs. motor modes. Because power is dependent upon the sense of the speed (torque remains of the same sense), the power will be considered to be positive when the generator is acting as a generator and negative when the generator is acting as a motor.

When desiring to slow the speed of the engine, the current being supplied to the generator is changed causing the speed of the generator to slow. Through the planetary gear set, this in turn slows the engine. This effect is accomplished because the resistive force acting against the torque of the generator is less at the engine than at the drive shaft which is connected to the wheels and is being influenced by the entire mass of the vehicle. It should be appreciated that the change in speed of the generator is not equal, but instead proportional to that of the engine because of gearing ratios involved within the connection therebetween.

In conventional vehicles, the cooling system has a variety of components that require cooling by a fluid cooling system, radiator and fan. Fluid cooled components typically include the engine and transmission. A fluid coolant circulates through a closed cooling loop, passes through each component to absorb heat, and then passes through the radiator. The radiator exposes the coolant to the fan's airflow and releases the heat. A controller monitors engine and transmission temperatures and adjusts fan speed to maintain acceptable coolant temperature for the cooling loop. In addition to the fluid cooled components, the air conditioning (A/C) condenser requires cooling from airflow that comes from the fan(s) to keep the A/C compressor head pressures at acceptable levels.

In electric and hybrid electric vehicles the high voltage system and other electronic components unique to such vehicles require cooling. However, the conventional cooling system described above does not provide an appropriate temperature differential to remove the heat which builds up in the electronic components. Therefore a separate cooling system is commonly used to cool the electronic components of an electric or hybrid electric vehicle.

For example, in a typical hybrid electric vehicle, a DC/AC inverter and a DC/DC converter require cooling below the temperature range typically found in conventional internal combustion engine cooling systems. Without an adequate cooling system, the build up of the heat load during operation of a converter and/or an inverter threatens the operation and efficiency of these electrical devices as well as the operation of the vehicle itself. The present approach to eliminate or at least reduce heat build up includes the use of a separate radiative cooling system with a liquid coolant temperature significantly lower than the liquid coolant used to cool an internal combustion engine of a vehicle.

Even with use of a separate cooling system for the inverter and/or converter, the electrical components are threatened by the build up of heat during hot ambient conditions or extreme operating conditions. When such conditions occur, the present electronics cooling strategy calls for the electronic device to monitor its own temperature and shut down thereby preventing damage due to overheating. Such shut downs deprive the user of a fully functional hybrid electric vehicle.

Several deficiencies associated with the use of known hybrid electric vehicle designs and methods of operating the same have been described hereinabove. Several inventive arrangements and methods for operating hybrid electric vehicles are described hereinbelow that minimize, or remedy these deficient aspects of known designs, and/or provide benefits, in and of themselves, to the user. These new, improved and otherwise potentiated solutions are described in greater detail hereinbelow with respect to several alternative embodiments of the present invention.

SUMMARY OF INVENTION

In one aspect, a cooling arrangement for electronic components in a hybrid electric vehicle is disclosed. The arrangement includes an electronics cooling loop aboard a hybrid electric vehicle in which a DC/DC converter, DC/AC inverter and an electronics radiator are fluidly connected to each other to cool the converter and inverter. In a preferred embodiment, a electronics radiator fan is positioned near the electronics radiator to cause or enhance air flow across the electronics radiator. In yet another embodiment, a coolant pump is fluidly connected to the electronics cooling loop to cause fluid circulation. A temperature sensor in the cooling loop senses a temperature which is communicated to a supervisory module. The temperature sensor may be located at or near a cooling inlet of the DC/DC converter or between the DC/DC converter and DC/AC inverter. Based on the temperature input, the supervisory module controls the operation of the DC/DC converter. In a preferred embodiment, the supervisory module controls the DC/DC converter based on ambient outside temperature, radiator fan speed, air conditioning system operational modes, lighting system operation modes, and battery system energy capacity. By controlling the operation of the DC/DC converter, the heat contribution from the converter to the electronic cooling loop can be reduced or eliminated. While the DC/DC converter is shut down to reduce or eliminate the heat load of the electronics cooling system, electrical power can be supplied by the 12-volt battery and/or a conventional alternator driven by the internal combustion engine. In a preferred embodiment, the DC/DC converter is located upstream of the DC/AC inverter in the electronics cooling loop.

In yet another preferred embodiment, the supervisory module further controls the operating capacity of the DC/AC inverter based on the temperature in the electronics cooling loop. The supervisory module's control over the DC/AC inverter allows the operating capacity of the inverter to be varied in response to a temperature of the electronics cooling system, thereby varying the heat contribution from the inverter to the electronics cooling loop. By reducing the operational capacity of the inverter, a corresponding heat load reduction occurs in the electronics cooling loop, thereby extending the duration of operating the hybrid electric vehicle under extreme operating scenarios and especially in hot ambient environments.

In another aspect, a method of controlling a cooling arrangement for electronic components in a hybrid electric vehicle is disclosed. In the most basic form, the method of control includes arranging an electronics cooling loop aboard a hybrid electric vehicle in which a DC/DC converter, DC/AC inverter and an electronics radiator are placed in fluid connection with each other to cool the converter and inverter, sensing a temperature in the electronics cooling loop, and selectively operating the DC/DC converter based on the sensed temperature in the electronics cooling loop. A preferred method of control includes controlling a pump that is fluidly connected to the electronics cooling loop for varying fluid flow, and controlling an electronics radiator fan, which in operation, causes air flow across the electronics radiator. In addition to, or apart from the control methods described above, selective operation of the DC/DC converter is based upon the cooling loop temperature sensed, ambient outside temperature, lighting system operational modes, and battery system energy capacity. As well as controlling the DC/DC converter to alter the heating load of the cooling loop, the speed of the electronics radiator fan can be controlled. In addition to or apart from the control methods described above, selective variation of the DC/AC inverter's operating capacity occurs based upon the temperature sensed in the electronics cooling loop. As can be appreciated by those skilled in the art, the basic and alternative methods of controlling the converter and/or the inverter, as set forth, reduces the heat load of the electronics cooling loop. In doing so, a smaller electronics radiator can be utilized thereby saving on space and weight in the hybrid electric vehicle.

The general beneficial effects described above apply generally to the exemplary descriptions and characterizations of the devices, mechanisms and methods disclosed herein. The specific structures and steps through which these benefits are delivered will be described in detail hereinbelow.

BRIEF DESCRIPTION OF DRAWINGS

In the following, the invention will be described in greater detail by way of examples and with reference to the attached drawings, in which.

DETAILED DESCRIPTION

As required, detailed embodiments of the present invention are disclosed herein; however, it is to be understood that the disclosed embodiments are merely exemplary of the invention(s) that may be embodied in various and alternative forms. The figures are not necessarily to scale; some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
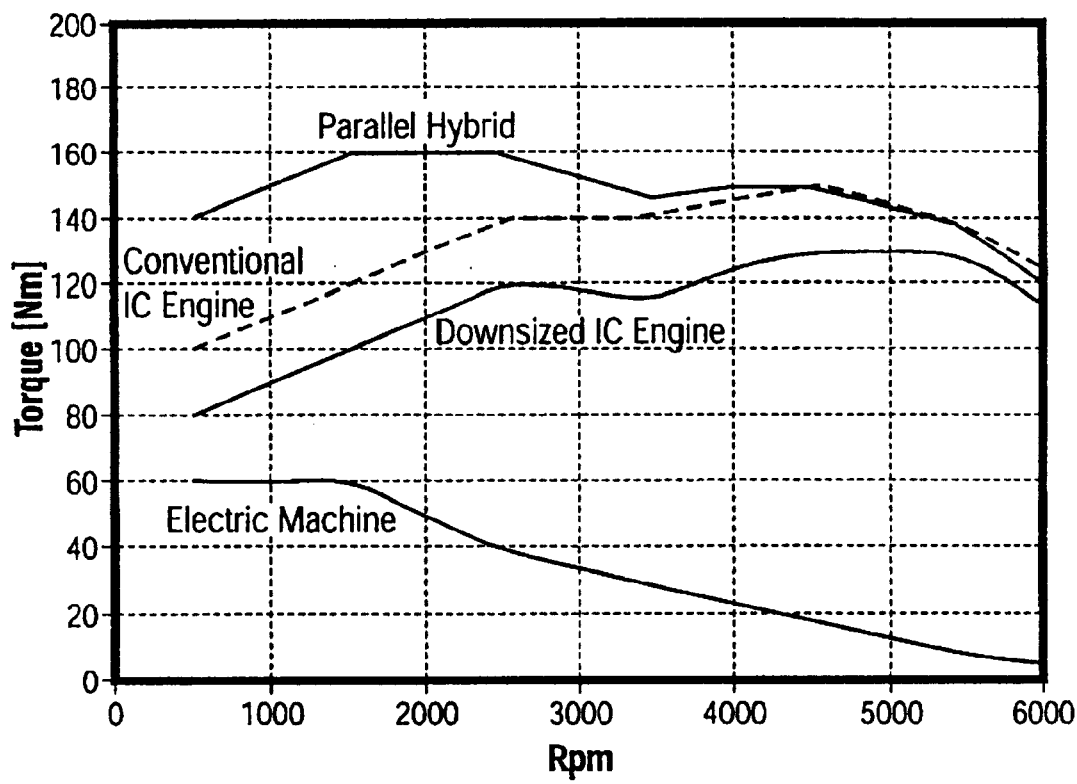
FIG. 1 is a graphical comparison of torque generated by a parallel hybrid and systems that have either an engine or motor.
Figure 2:
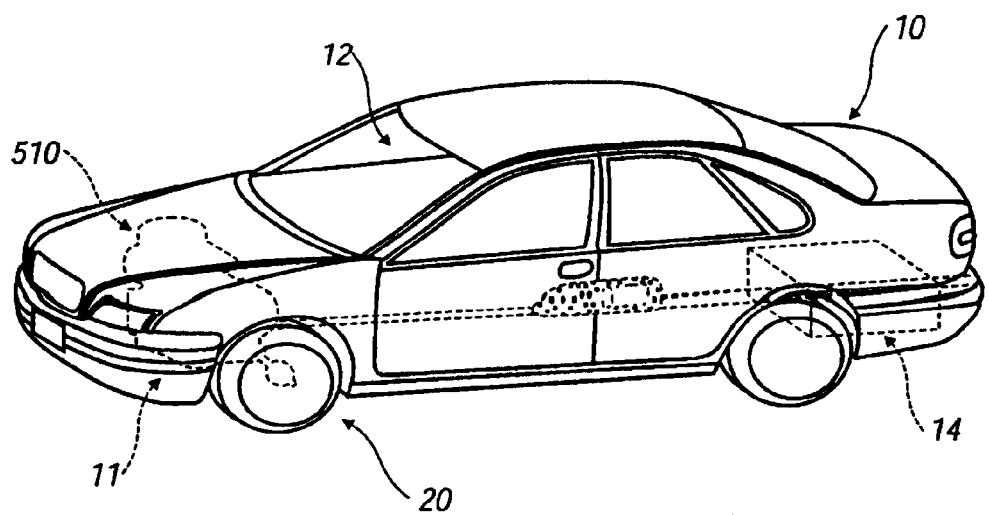
FIG. 2 is a perspective of a hybrid electric vehicle showing exemplarily system component locations on the vehicle.

As depicted in FIGS. 1 and 2, a hybrid electric transporting vehicle 10 has a power train system (having components generally designated with reference numbers from the 500's series) included therein for providing propulsion, as well as serving supplemental functions which are described in greater detail herein. Predominantly, the power train system is positioned in an engine room 11 located near a passenger compartment 12 of the vehicle 10. A battery compartment or housing 14, also positioned near the passenger compartment 12 holds one or more batteries 410. As will be appreciated by those skilled in the art, the positioning of the engine room 11 and battery housing 14 is not limited to the locations set forth in FIG. 2. For example, the engine room 11 may be positioned in front of, or behind the passenger compartment 12.

As depicted in FIG. 2, the overall systems architecture of the electric hybrid vehicle 10 comprises an engine system 510, including an internal combustion engine 511 (petrol, diesel or the like), that is mechanically connected by an output shaft system 520 to a transaxle system 530. The transaxle system 530 is further connected to a drive shaft system 540 utilized to rotate one or more drive wheels 20 that propel the hybrid electric transporting vehicle 10. In a preferred embodiment, the combustion engine 511 is controlled by an engine control module (ECM) or unit 220 which is capable of adjusting, among possible parameters, airflow to, fuel flow to and/or ignition at the engine 511. The engine 511 is mechanically connected via an output shaft 522 to the transaxle system 530. A planetary gear set 535 establishes interconnection between the engine 511 (via the output shaft 522), a generator 532, and the drive shaft system 540 (via the transaxle system 530). A motor 531 is also coupled to the drive shaft system 540, also possibly via the transaxle system 530.

Figure 3:
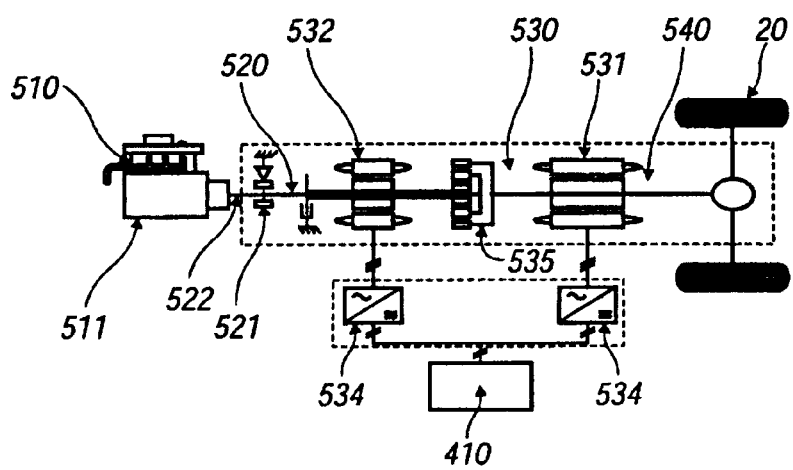
FIG. 3 is a schematic depicting the architecture of a power-split hybrid electric vehicle.

In one embodiment, and which is illustrated in FIG. 3, a one way clutch 521 is engageable with the output shaft 522, which in turn is connected to the engine 511 and to the planetary gear set 535. The function of the one-way clutch 521 is to limit the engine to being only a power/torque input to the planetary gear set 535, and with only one direction of rotation. Consequently, the one-way clutch 521 prevents power or torque from being transmitted from the planetary gear set 535 back to the engine 511.

Figure 4:
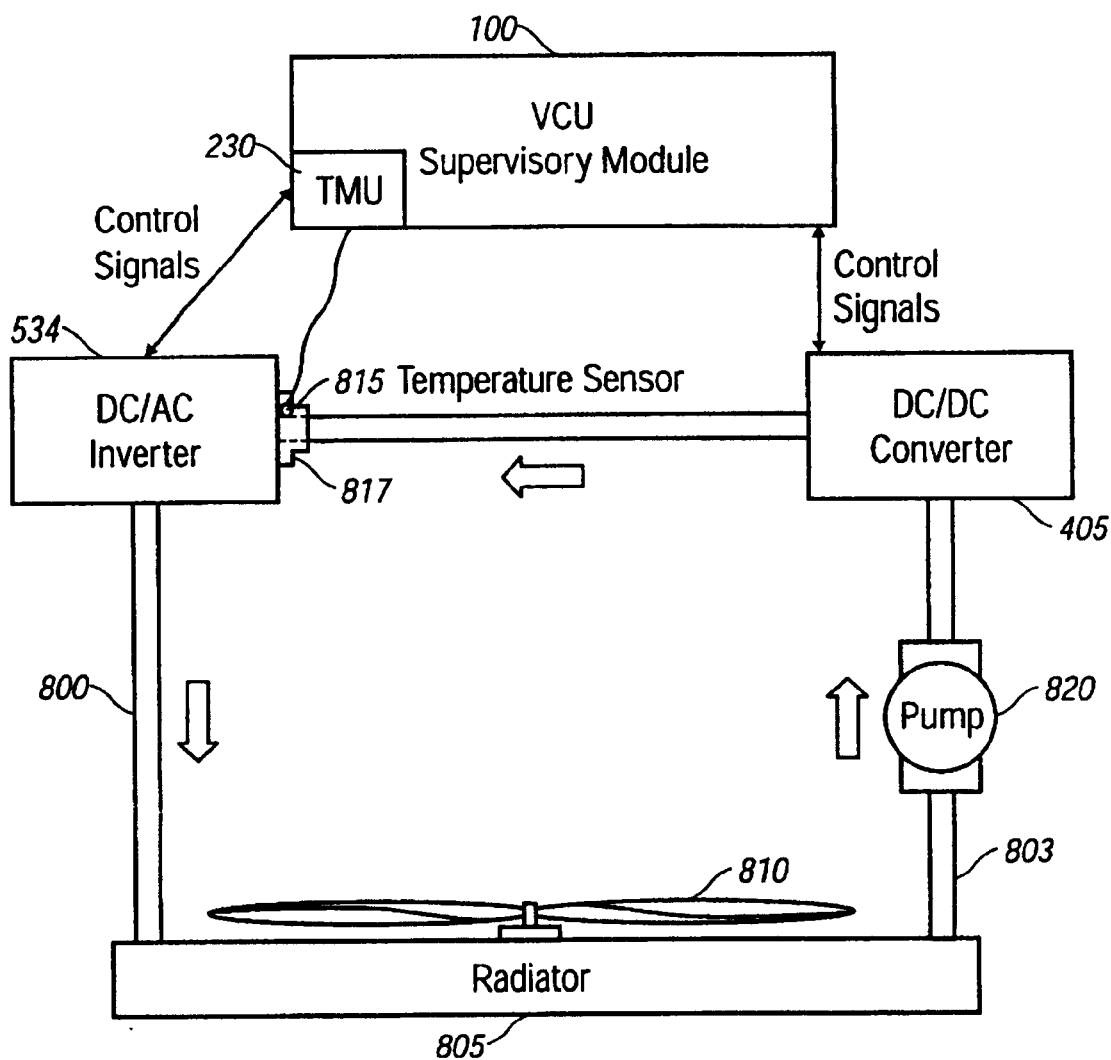
FIG. 4 is a schematic depicting the layout of the electronics cooling loop and the control relationships between the vehicle control unit and the electronics cooling loop.
Figure 5:
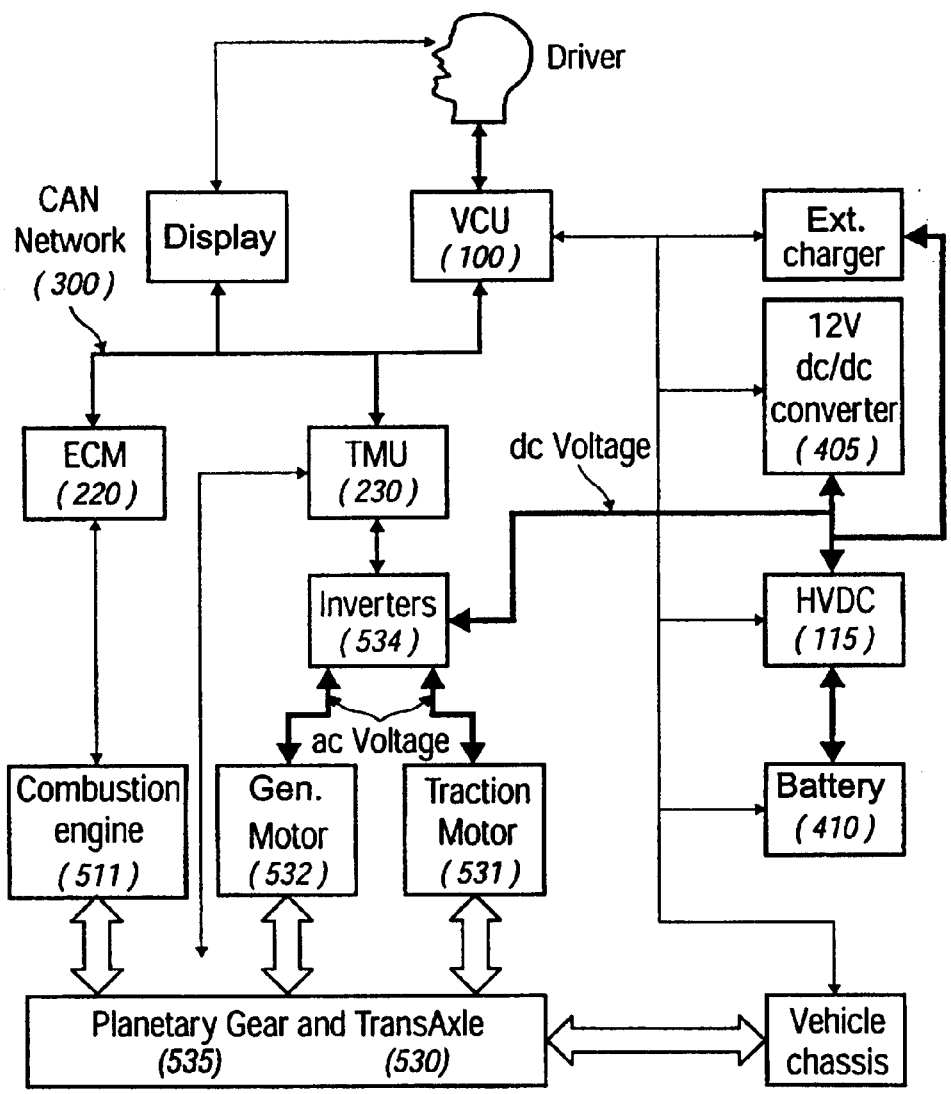
FIG. 5 is a schematic depicting control relationships between the various systems of a hybrid electric vehicle as coordinated utilizing the CAN.
Figure 6:
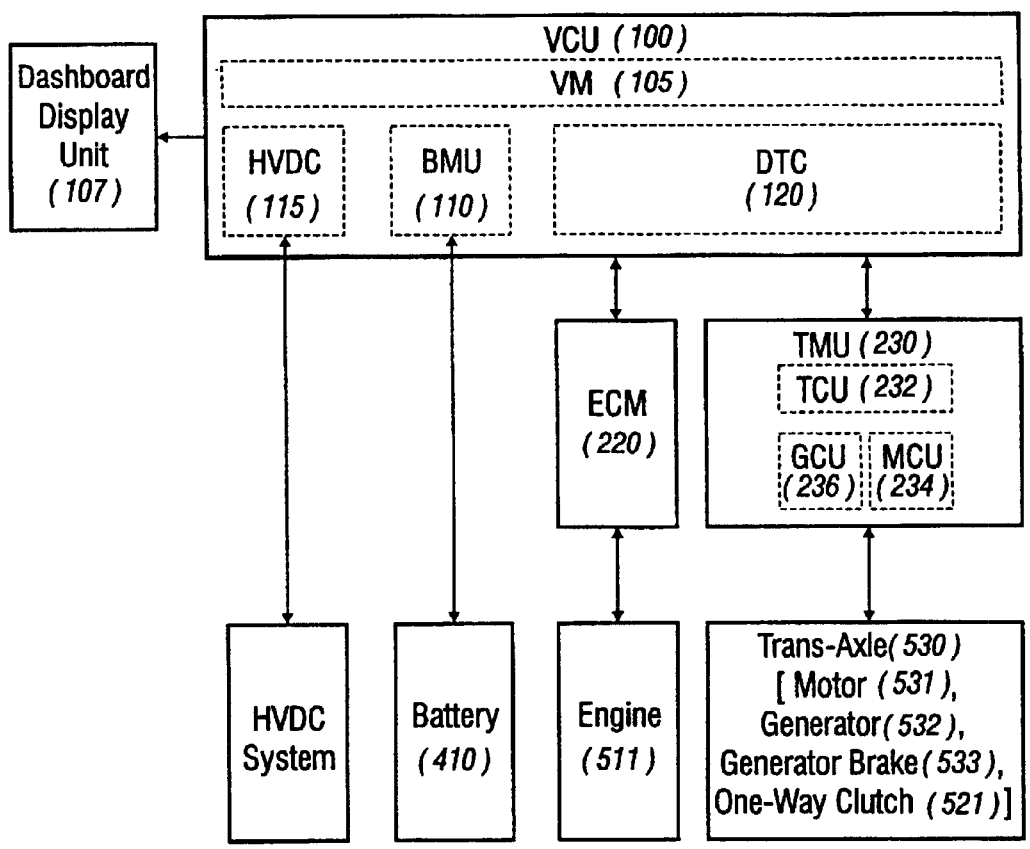
FIG. 6 is a functional schematic depicting the processes, tasks and controls of the various systems of the exemplary hybrid electric vehicle.

Based on the above disclosed system architecture, implementation of an energy management strategy, which is a focus of the hybrid electric vehicle 10, starts at a high level within a vehicle control unit or vehicle systems controller (VCU) 100 as schematically shown in FIGS. 4, 5 and 6. The vehicle systems controller 100 is programmed with control strategies for the drive train system and battery system, as well as others. The vehicle systems controller 100 is responsible for interpreting inputs, coordinating the component controllers, and determining vehicle system operating states. The VCU 100 also generates commands to appropriate component sub-systems based on defined vehicle systems controller 100 functions, and sends those commands to the component controllers that, based thereon, take appropriate actions. The vehicle systems controller 100 also acts as a reference signal generator for the sub-system controllers. The vehicle systems controller 100 may take the form of a single, integrated microprocessor, or comprise multiple microprocessors that are suitably interconnected and coordinated.

A primary function of the vehicle systems controller 100 is to carry out vehicle mode processes and tasks (also known as the sequential control process), as well as make torque determinations, set reference values and perform energy management processes. Certain systems of the vehicle 10 are managed or monitored by a vehicle management (VM) unit or controller 105 which carries out sequential control processes, including ascertaining the position of the vehicle key and gear selector positioning, among others. It is at this level that certain inputs from the driver and conditions of the vehicle are synthesized for utilization as command inputs for sub-system controllers.

At the lower level of the VCU 100, three sub-component controllers are illustrated in FIG. 6. The first is a high voltage DC controller (HVDC) 115; the second is a battery management unit or controller 110 (BMU); and the third is a drive train controller 120 (DTC). As indicated above, certain inputs and processes are taken from the driver and the vehicle's systems at the vehicle management unit 105. Conversely, certain outputs relevant to the driver will be transmitted and displayed at the dashboard display unit 107 from the VCU 100 or the VM 105.

The HVDC 115 is responsible for coordinating operation of the high voltage components. The positioning of this controller is schematically shown in FIG. 6. The HVDC contains contractors or breakers which are normally positioned to an open configuration that prevents electricity from flowing thereacross. But when called on to take action and engage the battery 410, for instance when starting of the engine 511 is required, these contractors (usually a pair) close completing an appropriate connective circuit.

As shown in FIG. 5, the HVDC serves as a shield or buffer between the high voltage battery 410, and the inverters 534, as well as other auxiliary loads run off of the electric power of the battery 410. An example of such a high voltage auxiliary load may include an electrically run air-conditioning compressor system. In order to act as such a buffer, the high voltage output from the battery 410 must be relatively slowly "brought-up" to operating levels at the inverter 534 and/or auxiliary loads. In order to accept this "run-up" of the voltage, relatively small capacity contractors are initially closed that cause voltage from the battery to pass to a capacitor in either the inverter 534 or the appropriate auxiliary load, across a resistive circuit (a circuit containing buffering resistors). Once an appropriate pre-charge is built-up in the capacitor, primary contractors are then closed which complete the high voltage circuit between the batteries 410 and the capacitor contained within the receiving component which may be exemplified by the DC to AC inverter(s) 534, or an auxiliary load such as an electric air-conditioning system as indicated hereinabove. In this manner, a potentially damaging high voltage is prevented from being introduced too quickly to the receiving components.

The HVDC 115 also carries out certain diagnostic functions regarding the components of the HVDC 115, such as the contractors within the HVDC 115 itself, and also possibly the several systems interconnected through the HVDC, such as the battery 410, the inverters 534, or an electrically driven air-conditioning compressor which has not been illustrated in the Figures. Among other parameters, these diagnostics may be performed based on measurements of voltage and/or current.

The HVDC 115 also provides interconnection between an exterior charger connection (see ext. charger in FIG. 5), thereby allowing the battery 410 to be "plugged-in" for charging from an external power source.

The battery management controller (BMU) 110 handles control tasks relative to the battery system 410. Among other characteristics, the BMU 110 can estimate and measure state-of-charge (SOC) levels, and voltage and current parameters. It can also sense/determine and maintain maximum and minimum voltage and current levels with respect to the battery 410. Based on these determinations or sensed quantities/qualities, the VM 105, via such control modules as the DTC 120, can direct certain operations for affecting changes in the SOC of the battery 410. Other characteristics which may be monitored include operating temperature(s) of the battery 410, and voltages at the individual battery cells. Similarly, pressure within the cells can also be monitored. Failures may be detected and reported, at least back to the VCU; but there is also the possibility of the information being passed to the operator via the dashboard display unit 107.

The DTC 120 makes the mode selection under which the several powering components will cooperate. That includes choices between parallel and split modes, as well as positive and negative split modes. The operational points for the several components of the drive train are also specified by the DTC 120. Still further, reference values are provided by the DTC 120 for the several sub-systems, including the transaxle management control modules or unit (TMU) 230 and the engine control module or unit (ECM) 220. From among the possible settings established by the DTC 120, battery charging/discharging mode is a possibility, as well as specifying whether the generator 532 and/or motor 531 should be used in their powering capacity as a motor, or their generating capacity as a generator. Torque references for the generator and motor are also issued from the TMU 230.

As a sub-component under the TMU 230, the transaxle control unit TCU 232 handles the transaxle 530 with respect to torque compensation when starting and stopping the engine 511. The TCU 232 uses and controls two slave processors characterized as a generator control unit GCU 236 and a motor control unit MCU 234. The GCU 236 handles the current and torque control of the generator 532; typically, via the inverter 534. The GCU 236 receives its torque and speed reference information from the TCU 232 as its immediate controller. The TCU 232 receives a total torque reference for the transaxle 530 and the speed reference value for the engine 511, together with mode reference information regarding cooperation between the engine 511 and generator 532; such as, whether parallel-, positive-split, or negative-split mode configurations will be assumed. The TCU 232 generates the torque reference parameters for the generator 532 and motor 531, each of which are implemented under the control of the GCU 236 and MCU 234, respectively. The specified torque settings are accomplished by controlling the current provided to the respective generator/motor controllers 236, 234.

Based on a map of optimal engine torque vs. speed curves, engine speed and torque are selected by the DTC 120 so that the engine system 510 can deliver the desired engine power and simultaneously lie on one of the engine's optimized efficient curves. If the DTC 120 determines that the speed of the engine 511 is too low for efficient operation, then the engine 511 is turned (or left) off by the engine control unit 220. If the power train control module 120 determines that the speed of the engine 511 is too high to be controlled by the generator 532 (based on SOC and generator limitations), the engine 511 is set to a slowed operational speed by the ECM 220.

Once the speed, torque and power of the engine 511 are determined by the vehicle systems controller 100, particularly at the DTC 120 of the controller 100, then the DTC 120 further determines the required speed and torque of the generator 532 to control the engine 511. The DTC 120, using this information, then determines the required speed and torque of the motor 531 to meet the difference, if any, between driver power (torque) demand and the engine power (torque).

Torque determination and monitoring is also carried out at the VCU 100. This function further ensures that torque delivered to the drive wheel(s) 20 is substantially equal to the torque (acceleration) demanded by the driver. The VCU 100 also monitors and controls the torque from the engine 511 and transaxle system 530 by comparing a sensed torque against the torque demanded by the driver. Torque management by the VCU 100 interprets driver inputs and speed control demands to determine regenerative brake torque and desired output shaft torque.

From the VCU 100, commands and references are distributed over a controller area network (CAN) 300 to component controllers generally referenced herein utilizing reference numbers in the 200's series. As indicated above, these controllers include the ECM 220 and the TMU 230 that together control the power train system to achieve efficient energy management, partition torque, determine engine 511 operating point (s), and decide on, and coordinate engine 511 start/stops. Commands and references from the VCU 100 to a series regenerative brake controller determine regeneration torque limitations, desired regenerative torque and zero vehicle speed control.

Finally, if and/or when individual system components are rendered inoperative, such as the motor 531 becomes disabled, the VCU 100 is configured to provide limited operating control over the power train system to allow the hybrid engine vehicle 10 to "limp" home.

As shown in FIG. 4, a preferred embodiment of an electronics cooling system 800 includes an electronics cooling loop 803, an DC/AC inverter 534, a DC/DC converter 405, a electronics coolant pump 820 and a electronics radiator 805 in fluid communication with each other. The electronics coolant pump 820 may be located upstream of the DC/DC converter 405. The electronics coolant flowing in the electronics cooling loop 803 transfers heat from the inverter 534 and/or converter 405 to the electronics radiator 805. As the electronics coolant passes through the electronics radiator 805 heat is rejected from the electronics cooling loop 803. In an alternative configuration, an electronics radiator fan 810 draws air across the electronics radiator 805 to promote the rejection of heat from the electronics cooling loop 803.

As can be appreciated by those skilled in the art, a significant portion of the heat load from the electronics cooling system 800 can be shifted to the cooling system of the internal combustion engine 511 by including an alternator (driven by the internal combustion engine 511) in the 12 volt electrical system of the hybrid electric transporting vehicle 10. Operation of the alternator (and therefore supply of 12 volt power) would not be affected by shut down of the DC/DC converter 405 due to heat. Such an independent source for the 12 volt system effectively shifts the heat load from the electronics cooling system 800 to the cooling system of the internal combustion engine 511 which is the drive source for the alternator. The use of the alternator with the DC/DC converter 405 provides redundancy in the 12 volt electrical system. Furthermore, the use of the alternator allows the DC/DC converter 405 to be reduced in size or completely eliminated. If small enough, the DC/DC converter 405 can be removed from the electronics cooling system 800. By utilizing the alternator and/or properly positioning the DC/AC inverter 534, DC/DC converter 405, and radiator 805 in the engine room 11, the electronics cooling pump 820 and/or the electronics radiator fan 810 can be reduced in size or even eliminated from the electronics cooling loop 803 without compromising the cooling capabilities of the electronics cooling system 800. For example, by placing the electronics radiator 805 near the radiator or radiator fan for the internal combustion engine 511, the electronics radiator fan 810 can be eliminated. Such reductions in size or elimination of components reduces vehicle weight and increases the amount of usable volume for other components of the hybrid electric transporting vehicle 10.

In any of the embodiments described above, a temperature sensor 815 is positioned in the electronics cooling system 800 to sense a temperature condition in the electronics cooling loop 803. The temperature sensor 815 communicates the temperature condition to a supervisory module. In a preferred embodiment, the temperature sensor 815 is positioned at the coolant inlet 817 of the DC/AC inverter 534. In another embodiment, the temperature sensor 815 is positioned between the DC/DC converter 405 and the DC/AC inverter 534 to sense the temperature condition in the electronics cooling loop 803 as electronics coolant flows from the DC/DC converter 405 to the DC/AC inverter 534.

Based upon the sensed temperature condition of the electronics cooling loop 803, the supervisory module controls the operation of the DC/DC converter 405. In a preferred embodiment, the supervisory module also controls the operational capacity of the DC/AC inverter 534 based upon the sensed temperature condition of the electronics cooling loop 803. The supervisory module may also control the operation of the electronics radiator fan 810 and/or the electronics coolant pump 820 based upon the sensed temperature condition of the electronics cooling loop 803.

In a preferred embodiment, the VCU 100 is the supervisory module and carries out control of the DC/DC converter 405, DC/AC inverter 534, electronics coolant pump 820, and electronics radiator fan 810. In addition to receiving and controlling in response to the sensed temperature of the electronics cooling loop 803, the VCU 100 (or supervisory module) may consider ambient outside temperature, electronics radiator fan 810 speed, air conditioning system operational modes, lighting system operational modes, and/or battery system energy capacity and state-of-charge. Each of these aspects contribute individually and collectively to the cooling loop's 803 heat load. In the most preferred embodiment, control of the DC/AC inverter 534 is carried out at a lower level of the VCU 100, namely the TMU 230.

Another aspect of the present invention is a method of controlling the electronics cooling system 800. The cooling method includes: arranging an electronics cooling loop 803 aboard a hybrid electric transport vehicle 10 in which a DC/DC converter 405, DC/AC inverter 534 and an electronics radiator 805 are placed in fluid communication with each other, for cooling the DC/DC converter 405 and the DC/AC inverter 534; sensing a temperature condition in the electronics cooling loop 803; and discontinuing operation of the DC/DC converter 405 when a predetermined upper threshold temperature is sensed in the electronics cooling loop 803. In an alternative method, the cooling method further includes reducing the operating capacity of the DC/AC inverter 534 when the predetermined upper threshold temperature condition is sensed. In a preferred alternative method, a stepped reduction of the DC/AC inverter's 534 operating capacity continues until the predetermined upper threshold temperature condition is sensed. In the most preferred alternative method, the stepped reduction results in discontinuing operation of the DC/DC converter 405 when the predetermined upper threshold temperature condition is sensed. The method contemplates the lower threshold temperature having a magnitude of approximately 57° centigrade when measuring the electronics coolant flowing between the DC/DC converter 405 and the DC/AC inverter 534. The control method further contemplates the upper threshold temperature having a magnitude of approximately 60° centigrade when measuring the electronics coolant flowing between the DC/DC converter 405 and the DC/AC inverter 534.

The control method may include the step of resuming operation of the DC/DC converter 405 after a predetermined time period elapses from the time of shutting down the DC/DC converter 405. The method may also include the step of resuming operation of the DC/DC converter 405 when a predetermined resumptive temperature condition is sensed in the electronics cooling loop 803 before the expiration of the predetermined time period. The control method contemplates the predetermined resumptive temperature having a magnitude of approximately 5520 centigrade when measuring the electronics coolant flowing between the DC/DC converter 405 and the DC/AC inverter 534. The control method contemplates the predetermined time period to be calculated based on ambient outside temperature, electronics radiator fan 810 speed, air conditioning system operational modes, lighting system operational modes and/ or battery system energy capacity. The control method may include a resumptive step which resumes operation of the DC/DC converter 405 when the predetermined resumptive temperature is lower than the predetermined lower threshold temperature. The control method may also include a resumptive step which resumes operation of the DC/DC converter 405 when a predetermined resumptive lower voltage (energy) limit of the 12 volt battery is lower than the predetermined lower threshold voltage (energy) level. In the most general form, the most preferred control method contemplates a hysteresis-type control strategy to shut down and resume operation of the DC/DC converter 534.

Although the present invention has been described and illustrated in detail, it is to be clearly understood that the same is by way of illustration and example only, and is not to be taken as a limitation. The spirit and scope of the present invention are to be limited only by the terms of any claims presented hereafter.

What is claimed is:

1. A method for controlling a cooling arrangement for electronic components in a hybrid electric vehicle, said method comprising:
   arranging an electronics cooling loop aboard a hybrid electric vehicle in which a DC to DC converter, a DC to AC inverter, and an electronics radiator are placed in fluid communication, one with the others, for cooling said DC to DC converter and said DC to AC inverter;
   sensing a temperature condition in said electronics cooling loop; and
   discontinuing operation of the DC to DC converter when a predetermined upper threshold temperature condition is sensed in said electronics cooling loop.

2. The method as recited in claim 1 further comprising:
   locating a sensor at an inlet to said DC to AC inverter for sensing a temperature of a cooling fluid as said cooling fluid enters said DC to AC inverter.

3. The method as recited in claim 1 further comprising:
   locating said DC to DC converter upstream of said DC to AC inverter in said electronics cooling loop.

4. The method as recited in claim 3 further comprising:
   locating a sensor between said DC to DC converter and said DC to AC inverter for sensing a temperature of a cooling fluid as said cooling fluid flows from said DC to DC converter to said DC to AC inverter.

5. The method as recited in claim 1 further comprising:
   reducing operating capacity of said DC to AC inverter when said predetermined upper threshold temperature condition is sensed.

6. The method as recited in claim 5 further comprising:
   continuing a step reduction of the operating capacity of said DC to AC inverter until a predetermined upper threshold temperature condition is sensed.

7. The method as recited in claim 6 further comprising:
   discontinuing operation of said DC to AC inverter when said predetermined upper threshold temperature condition is sensed.

8. The method as recited in claim 7 further comprising:
   designating said predetermined upper threshold temperature condition to be a temperature of cooling fluid flowing from said DC to DC converter to said DC to AC inverter having a magnitude of approximately 60° centigrade.

9. The method as recited in claim 7 further comprising:
   designating said predetermined upper threshold temperature condition to be a temperature of cooling fluid flowing from said DC to DC converter to said DC to AC inverter having a magnitude of approximately 57° centigrade.

10. The method as recited in claim 1 further comprising:
    resuming operation of the DC to DC converter after a predetermined time period expires, said predetermined time period beginning at initiation of said discontinuation of operation of said DC to DC converter after said predetermined upper threshold temperature condition has been sensed in said electronics cooling loop.

11. The method as recited in claim 10 further comprising:
    resuming operation of the DC to DC converter when a predetermined resumptive temperature condition is sensed in said electronics cooling loop, said resumptive temperature condition being lower than said predetermined lower threshold temperature condition, if said sensing of said predetermined resumptive temperature condition occurs before said predetermined time expires.

12. The method as recited in claim 11 further comprising:
    designating said predetermined resumptive temperature condition to be a temperature of cooling fluid flowing from said DC to DC converter to said DC to AC inverter having a magnitude of approximately 55° centigrade.

13. The method as recited in claim 10 further comprising:
    calculating said predetermined time period considering at least one characteristic from a group that includes: ambient outside temperature, radiator fan speed, air conditioning system operational modes, lighting system operational modes, and battery system energy capacity.

14. The method as recited in claim 10 further comprising:
    calculating said predetermined time period considering at least two characteristics from a group that includes: ambient outside temperature, radiator fan speed, air conditioning system operational modes, lighting system operational modes, and battery system energy capacity.

15. The method as recited in claim 10 further comprising:

calculating said predetermined time period considering at least three characteristics from a group that includes: ambient outside temperature, radiator fan speed, air conditioning system operational modes, lighting system operational modes, and battery system energy capacity.

16. The method as recited in claim 1 further comprising:

resuming operation of the DC to DC converter when a predetermined resumptive temperature condition is sensed in said electronics cooling loop, said resumptive temperature condition being lower than said predetermined lower threshold temperature condition.

17. The method as recited in claim 1 further comprising:

controlling discontinuation and resumption of operation of the DC to DC converter utilizing a hysteresis-type control strategy.

18. The method as recited in claim 1 further comprising:

affecting control over the operation of said DC to AC inverter and said DC to DC converter utilizing a vehicle systems controller aboard said hybrid electric vehicle.

19. The method as recited in claim 1 further comprising:

arranging said electronics radiator adjacent to a combustion engine radiator so that a common fan draws air across both said electronics radiator and said combustion engine radiator.

20. The method as recited in claim 1 further comprising:

minimizing the capacity of said electronics radiator by implementation of said method for controlling the cooling arrangement for electronic components in a hybrid electric vehicle and thereby minimizing a size of said electronics.

21. The method as recited in claim 20 further comprising:

facilitating packaging of said electronics radiator in a restricted area of the hybrid electric vehicle because of said minimization of said size of said electronics radiator.

22. The method as recited in claim 21 further comprising:

associating said electronics radiator with a combustion engine radiator in an engine compartment of the hybrid electric vehicle.

23. The method as recited in claim 1 further comprising:

affecting cooling fluid circulation in said electronics cooling loop utilizing a pump, said pump being located upstream of said DC to DC converter.

24. The method as recited in claim 1 further comprising:

sensing a voltage condition in a DC voltage source; and resuming operation of the DC to DC converter when a predetermined resumptive voltage condition is sensed in said DC voltage source, said resumptive voltage condition being lower than a predetermined lower threshold resumptive voltage.

* * * * *